Figure 1:
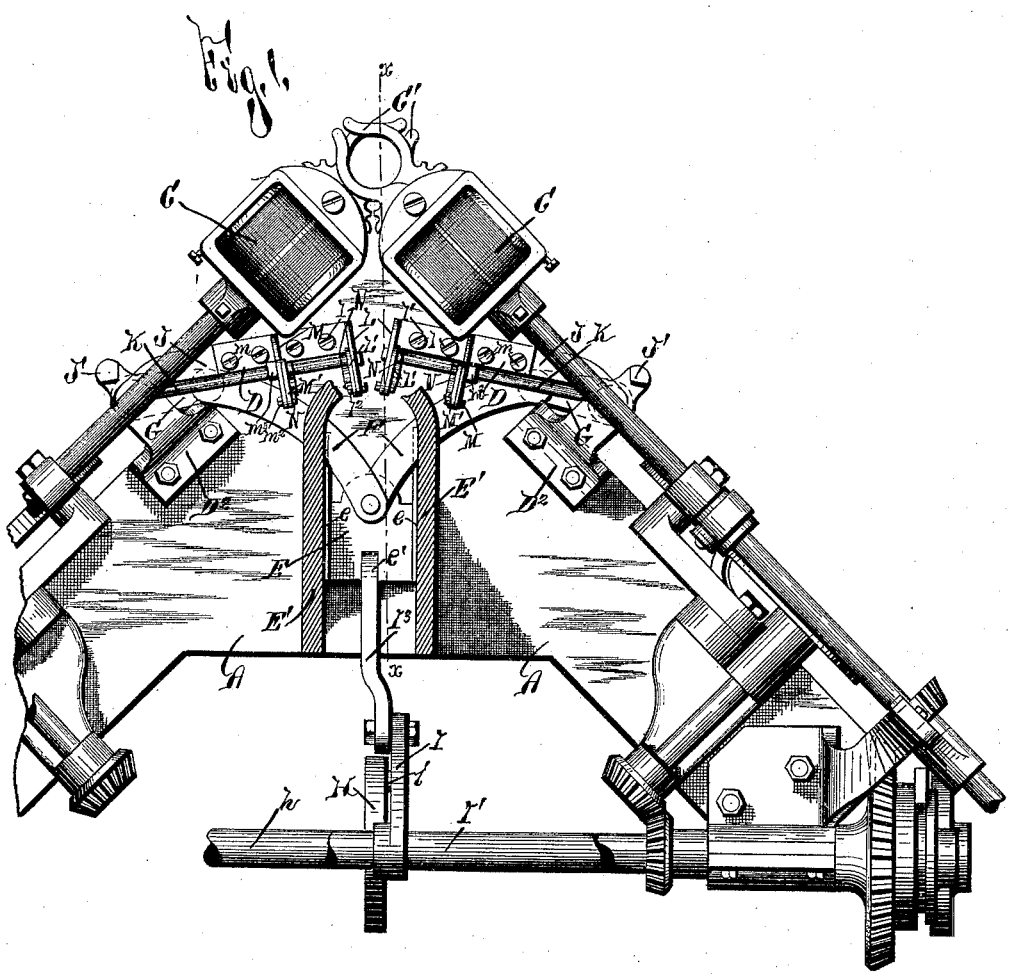

(No Model.) 5 Sheets—Sheet 1.

H. LACASSE & S. WILE.
CUTTING MECHANISM.

No. 443,193. Patented Dec. 23, 1890.

WITNESSES

INVENTORS

BY

ATTORNEY (No Model.) 5 Sheets—Sheet 2.
H. LACASSE & S. WILE.
CUTTING MECHANISM.
No. 443,193. Patented Dec. 23, 1890.
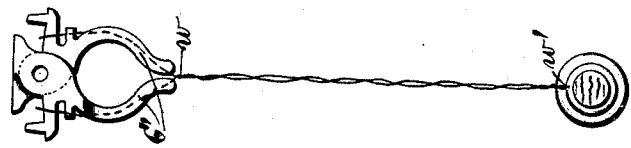
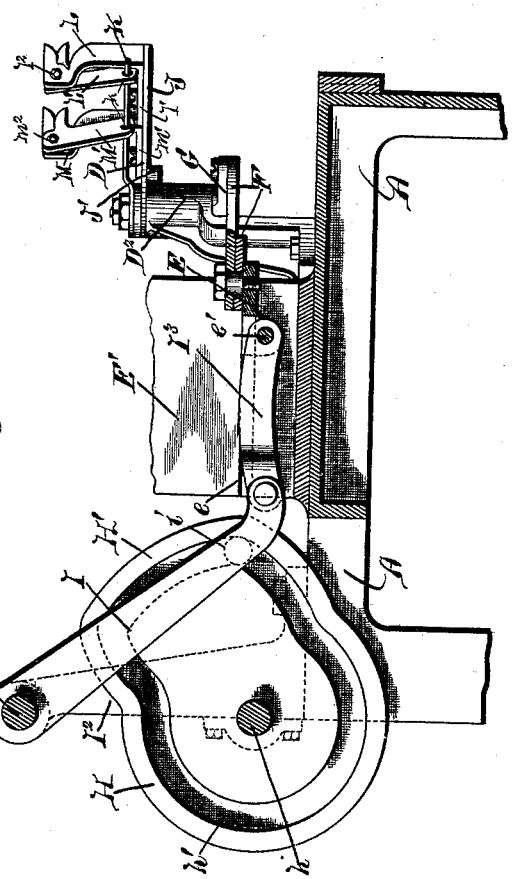
WITNESSES:
INVENTORS
Henry LaCasse & Sol Wile
BY
George W. Sieg
ATTORNEY.

(No Model.) 5 Sheets—Sheet 3.
H. LACASSE & S. WILE.
CUTTING MECHANISM.
No. 443,193. Patented Dec. 23, 1890.
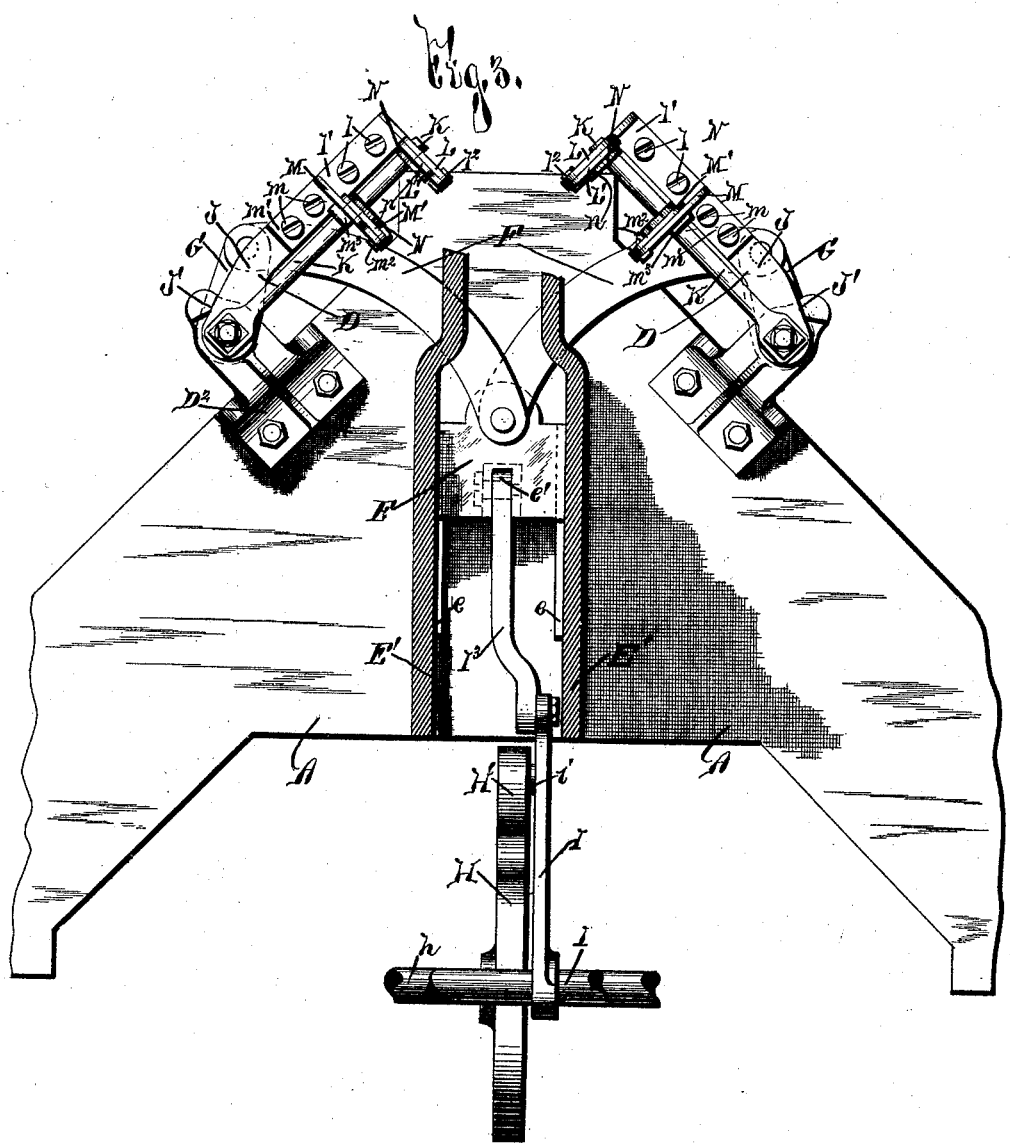
WITNESSES:
INVENTORS
Henry Lacasse & S. Wile
BY
George W. Hey
ATTORNEY (No Model.) 5 Sheets—Sheet 4.
H. LACASSE & S. WILE.
CUTTING MECHANISM.
No. 443,193. Patented Dec. 23, 1890.
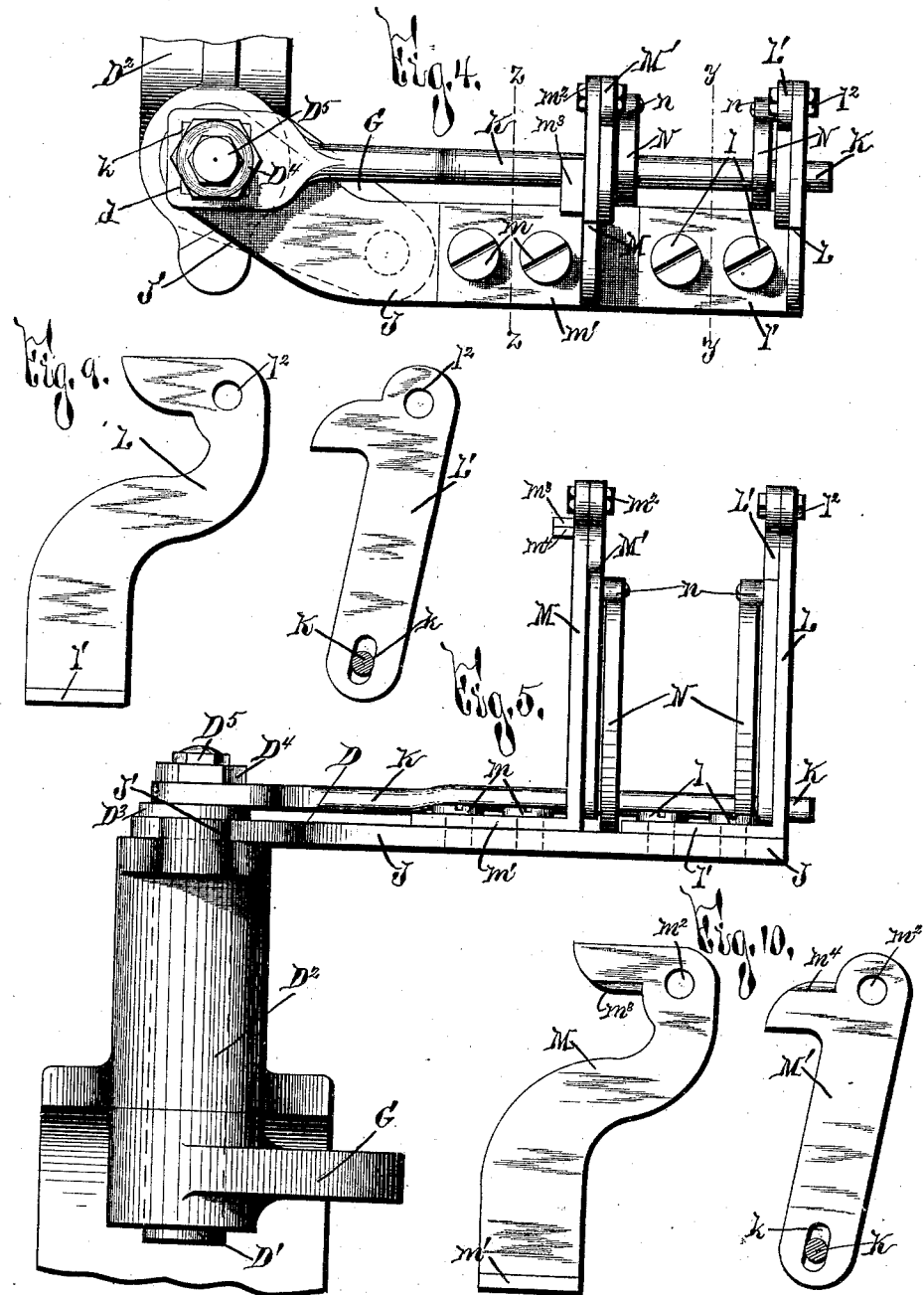
WITNESSES:
INVENTORS
BY
ATTORNEY (No Model.) 5 Sheets—Sheet 5.
H. LACASSE & S. WILE.
CUTTING MECHANISM.
No. 443,193. Patented Dec. 23, 1890.
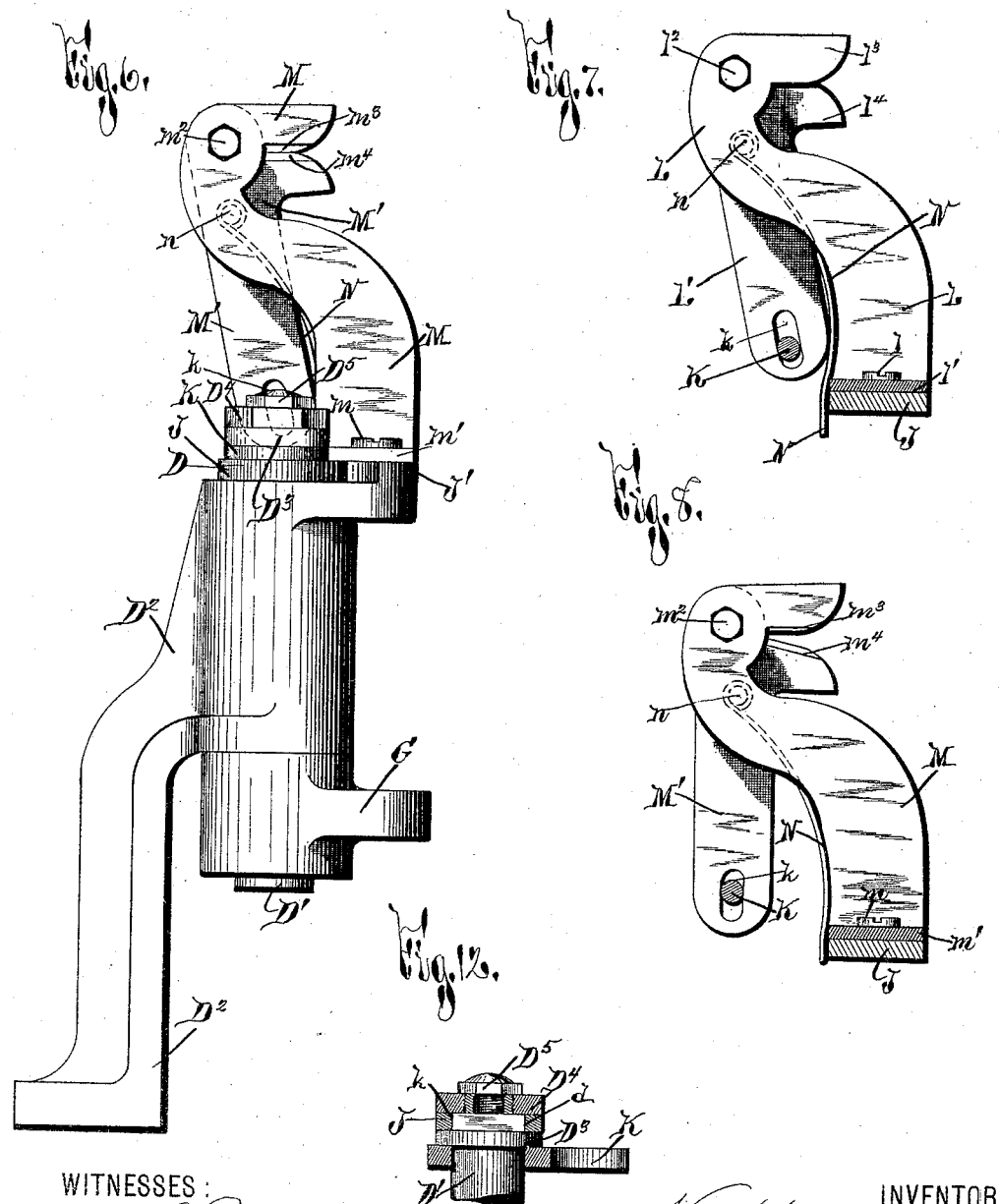

UNITED STATES PATENT OFFICE.

HENRY LACASSE AND SOL. WILE, OF ROCHESTER, NEW YORK, ASSIGNORS TO THE BOTTLERS' SPECIALTY COMPANY, OF SAME PLACE.

CUTTING MECHANISM.

SPECIFICATION forming part of Letters Patent No. 443,193, dated December 23, 1890.

Application filed November 9, 1889. Serial No. 329,751. (No model.)

*To all whom it may concern:*

Be it known that we, HENRY LACASSE and SOL. WILE, of Rochester, in the county of Monroe and State of New York, have invented new and useful Improvements in a Cutting Mechanism, of which the following, taken in connection with the accompanying drawings, is a full, clear, and exact description.

Our invention relates to an improved wire-cutting mechanism, and has for its object the production of a simple and effective device which quickly, automatically, and positively clips off wire, as desired; and to this end it consists, essentially, in a pair of supports or levers movable toward each other and swinging into and out of the path of the wire-feeding mechanism and cutting-jaws mounted upon said supports or levers.

It also consists in mounting upon said levers suitable wire-holding jaws which pinch the wire without cutting the same; and it furthermore consists in combining this wire-cutting mechanism with a shuttle or other mechanism for feeding the wire, in operatively connecting two or more of the shuttles so that they meet each other at an angle, in arranging the wire-cutting mechanism at an angle with each other and movable toward and away from a common point, and in mounting the said cutting mechanism between said shuttles, so as to swing or move from between said shuttles and operate upon the fed wire.

It still furthermore consists in the detail construction and arrangement of the parts, all as hereinafter more particularly described, and pointed out in the claims.

In describing our invention reference is had to the accompanying drawings, forming a part of this specification, in which like letters indicate corresponding parts in all the views.

Figure 1 represents a plan view of the preferable form of wire-feeding mechanism, with our wire-cutting mechanism illustrated in its normal position out of the path of said feeding mechanism. Fig. 2 represents a longitudinal vertical section taken on line $xx$, Fig. 1. Fig. 3 is a like view to Fig. 1, representing the wire-cutting mechanism as swung outward to engage the fed wire. Fig. 4 represents a plan view of the wire cutting and holding jaws and their supporting-levers, which levers are illustrated as detached from their operating mechanism. Fig. 5 represents an elevation of the parts as illustrated in Fig. 4. Fig. 6 is an end view of the parts as illustrated in Figs. 4 and 5. Figs. 7 and 8 are sections taken, respectively, on lines $yy$ and $zz$, Fig. 4. Fig. 9 is a detail of the detached cutting-jaws. Fig. 10 is a detail of the wire-holding jaws. Fig. 11 is a plan view illustrating the wire as connected to the bottle and the shuttle-jaws before said wire is cut off by our improved mechanism, and Fig. 12 is an enlarged detail view.

The table or frame A, upon which our improved mechanism is mounted, may be of any desirable form, size, and construction, but is here illustrated as that shown in our pending application, Serial No. 319,355, for an improved machine for corking bottles and wiring the corks thereto. This table is formed with its forward sides at an angle, and preferably a right angle, with each other, in order to allow for the mounting and operation of the actuating mechanism of the wire-feeding mechanism.

A pair of shuttles C, of suitable size, construction, and shape, are provided with forwardly-extending arms or jaws C', which overlap upon each other and are then operated to encircle the top of the bottle. After this encirclement the shuttles are then withdrawn from around the bottle, and when the jaws are clear of the bottle the shuttles are then rotated, twisting together the strands of wire.

As set forth in our before-mentioned application, the backward movement of the wire-feeder is very slow and indeed hardly perceptible at the commencement of its rotation, in order that a number of tight twists $w$ shall be formed immediately next to the bottle. Immediately after the forming of these tight twists the wire-feeding mechanism is then withdrawn more quickly, and as the same is meanwhile continually rotated the twists are much looser than those previously formed. Our improved wire-cutting mechanism is then brought into operation, and the wire is closely impinged by the holders thereof, as presently described. After this impingement of the wire by the holders the feeding mechanism is revolved two or three times, as desired, in order to form a number of tight twists $w'$ immediately back of the holders.

The actuating mechanism of this wire-feeding device has not been illustrated in this our present invention, as we make no claim thereto, since our cutting mechanism may be used upon any other desired form of feeding mechanism. This feeding mechanism, however, is preferably of the class illustrated and claimed in our pending application for patent, and it is unnecessary to describe further the operating mechanism and functions thereof, which have been only referred to in order that we might more clearly set forth the construction and operation of our present invention.

When the wire-feeding mechanism, as illustrated, consists of a pair of shuttles meeting each other at an angle and movable toward and away from their point of meeting, our wire-cutting mechanism consists of a pair of supports D, of desirable form, size, and construction, movable toward and away from the path of the separate wire-securing mechanisms. As illustrated, however, these separate supports consist of a pair of oscillating levers upon which are mounted separate wire cutting and holding jaws. As best shown in Figs. 1, 4, and 5, these levers are pivoted at one extremity to the bolt D', rocked or partially rotated by suitable mechanism, thus forcing outward or inward the free extremity of said supports D. The preferable form of this operating mechanism consists of a cross-head E, connected by a link F to a crank-arm G, secured to the bolt D'. This cross-head E is guided in ways $e$, provided upon the bracket E', rising from the table A, and is operated to and fro by a cam H, secured upon the shaft I, to which motion is transmitted by any suitable actuating mechanism. This cam H is formed with a groove $h'$, in which is guided a roller $i$, mounted upon a lever I, pivoted at I' to a suitable bracket $I^2$, supported upon the table A. Pivoted to the free extremity of the lever I is the link $I^3$, pivoted at $e'$ to the cross-head E. It will thus be seen that as the said lever I is forced forward by the cam-tooth H' of the cam H the cross-head will also be forced forward, swinging into operative position the separate supports D for the wire cutting and holding jaws. When the cross-head is retracted, these jaws are then drawn backward from operative position, and the wire-feeding mechanism moves forward to encircle the bottle and twist the wire thereto.

The bolt D' for the wire-cutting mechanism is supported in a suitable bracket $D^2$, mounted upon the table A. (Best illustrated in Figs. 5 and 6 of the drawings.) The support D, mounted upon this bolt, preferably consists of a pair of levers J and K, the former being loose upon said bolt and the latter rigidly secured thereto and preferably by an angular socket $k$, engaging an angular seat $d$, formed upon said bolt.

As seen in Fig. 12, a flange $D^3$ is formed upon the bolt D' and interposed between the levers J and K to facilitate their easy and independent operation. The lever J is retained in position by means of a nut $D^4$ and a bolt $D^5$, screwing into the top of the bolt D' and bearing upon the nut $D^4$.

Mounted upon the lever J are the cutting-jaw L and the holding-jaw M, preferably secured thereto by means of screws $l$ and $m$, passing through feet $l'$ and $m'$, formed upon said jaws. Pivoted to these jaws L and M at $l^2$ and $m^2$ are the respective cutting and holding jaws L' and M', the lower extremities of which are hinged to the lever K by passing the free extremity thereof through slots $k$ provided in said jaws.

In order to allow the cutting-jaws L L' and the holding-jaws M and M' to remain open in position for grasping the fed wire, their supporting-levers are held apart a suitable distance. The preferable means of holding these jaws apart consists of springs N, secured at $n$ to the cutting-jaw L' and holding-jaw M' and bearing against the adjacent face of the lever J, upon which are mounted the cutting-jaw L and the holding-jaw M. When the crank-lever G partially rotates the bolt D' and forces outward the lever K, rigidly secured thereto, it will be understood that the lever J will also be forced outward by reason of the springs N, interposed between the lever K and the jaws pivoted to the lever J. After the opened wire cutting and holding jaws have been swung into engagement with the wire the loose lever J strikes a suitable stop J', formed upon the bracket $D^2$, and the further movement thereof is prevented. The actuating mechanism, however, is so arranged that after this stoppage of the lever J there is a slight further operation of said mechanism, which forces outward for a short distance the lever K, rigidly secured to the bolt D'. This additional movement of the lever K is allowed by reason of the spring N, which yields sufficiently to allow the desired movement. Upon this movement of the lever K the cutting and holding jaws L' and M', hinged thereto, are swung upward upon their respective pivots $l^2$ and $m^2$ and are operated to cut off and hold the wire.

By reference to the drawings it will be understood that the cutting-jaws consist of plates hinged one to the other and formed with cutting-edges $l^3$ and $l^4$, shearing past each other, and that the holding-jaws, although of substantially the same construction as the cutting-jaws, are provided with the lateral extensions $m^3$ and $m^4$, one beneath the other, which, instead of cutting the wire, pinch or hold the same between said extensions.

It will be understood that when the wire is held by said jaws the wire-feeding mechanism has either entirely ceased its backward or feeding movement or else is operating but very slowly, and that at the same time the said mechanism is being rotated, which thus forms tight twists of the wire between said holding-jaws and the wire-feeding jaws. It will also be understood upon reference to the drawings that the cutting-jaws are at the forward ends of the levers J and K, and that considerable space intervenes between said jaws and the holding-jaws. The object of this construction is to cut off the wire substantially midway between the bottle and the feeding-jaws when in their rearward position, in order that after the wire is cut off and the shuttle-jaws have again encircled the bottle a portion of wire shall be left projecting from said feeding-jaws sufficient to be turned upward over the top of the bottle and the inserted cork and secured to the wire which projects therefrom after the operation of the feeding mechanism and our improved cutting mechanism.

The operation of our invention will be readily perceived from the foregoing, and it will be understood that while our improved cutting and holding mechanism is especially adapted for the particular arrangement of feeding mechanism of the wiring-machine described and claimed in our pending application either or both of the cutting or holding jaws might be utilized in various other wire-securing mechanisms, and consequently we do not limit them to any particular form of wire-feeding mechanism.

In our aforesaid applications, Serial Nos. 379,355 and 330,257, we have shown our improved cutting mechanism in operative combination with other mechanisms therein illustrated; but we do not wish to herein claim the structures set forth in the aforesaid applications. It will also be understood that without departing from the spirit of our invention considerable change may be made in the relative construction and arrangement of the parts. Hence the same is not limited thereto.

Having thus fully described our invention, what we claim as new, and desire to secure by Letters Patent, is—

1. In a cutter, the combination of wire-feeding mechanism, a pair of jaws, one of which is movable toward the other, holding-faces of said jaws, a second pair of jaws separated from the others, with one of said second pair hinged to the other, cutting-faces of said jaws, a movable support for said jaws for actuating them into and out of the path of said feeding mechanism, and means, substantially as described, for rocking said hinged jaws, substantially as and for the purpose set forth.

2. In a cutter, the combination of an oscillating lever, a pair of jaws, one of which is movable toward the other, mounted on said lever, holding-faces on said jaws, a second pair of jaws separated from the former and mounted on said lever, with one jaw movable toward the other, cutting-faces on said latter jaws, wire-feeding mechanism, and mechanism, substantially as described, for throwing said lever into and out of the path of the wire-feeding mechanism, substantially as and for the purpose specified.

3. In a cutter, the combination of wire-feeding mechanism with a pair of pivoted levers, one of which is loosely and the other rigidly secured to its pivotal pin, a spring bearing against said levers, whereby motion is communicated from the rigidly-secured lever to the loose lever, means, substantially as described, for rocking said pivotal pin and conveying motion to the levers, a stop for the loose lever, and wire-engaging jaws mounted on said levers, substantially as and for the purpose set forth.

4. In a cutter, the combination of oscillating levers having their free extremities movable toward and away from each other, with one of said levers loosely and the other rigidly secured to its pivotal pin, a spring between said levers for communicating motion from the rigidly-secured lever to the loose lever, a stop for the loose lever, wire-feeding mechanism adjacent to the separate levers, cutting-jaws mounted on said levers, and mechanism, substantially as described, for rocking said pivotal pin and throwing the cutting-jaws into and out of the path of the wire-feeding mechanism, substantially as specified.

5. In a cutter, the combination of oscillating levers having their free extremities movable toward and away from each other, wire-feeding mechanism adjacent to the separate levers, cutting-jaws mounted on said levers, holding-jaws mounted on said levers, and mechanism for throwing the said jaws into and out of the path of said feeding mechanism, substantially as specified.

6. In a cutter, the combination of a pair of movable supports, one of which is loosely and the other rigidly secured to its pivotal pin, a spring between said supports for conveying motion from one lever to the other, cutting-jaws mounted on said movable supports, wire-feeding mechanism adjacent to the movable supports, a sliding cross-head or block E, connected, substantially as described, to the pivotal pin of said supports, and a cam H, connected to said cross-head, substantially as set forth.

7. The combination of a pair of movable supports, one of which is loosely and the other rigidly secured to its pivotal pin, a spring between said supports for conveying motion from one lever to the other, holding-jaws mounted on said movable supports, wire-feeding mechanism adjacent to the movable supports, a cross-head E, connected, substantially as described, to the movable supports, and a cam H, connected to the cross-head E, substantially as described.

8. In a wire-cutter, the combination of a movable support or oscillating lever, and cutting-jaws mounted upon said lever, holding-jaws also mounted on said lever at a distance from the cutting-jaws, wire-feeding mechanism adjacent to said movable support, a cross-head E, and a cam H, substantially as and for the purpose specified.

9. In a cutter, the combination of the lever J, a fixed jaw L, a jaw L', hinged to said fixed jaw, a slot or cut-out $k$ in the hinged jaw, and a swinging lever K, engaging said slot or cut-out $k$, substantially as described.

10. In a cutter, the combination of the lever J, loosely mounted on the pivotal pin, a lever K, rigidly secured to said pin, separate cutting-jaws mounted on the said levers, a spring bearing against said levers, whereby motion is communicated to the loosely-pivoted lever for actuating the other lever, and mechanism for rocking said pivotal pin and operating said levers to cause the cutting-jaws to shear by each other, substantially as described.

11. The combination of the lever J, loosely mounted on a pivotal pin, a lever K, fixed to said pin, a fixed jaw mounted upon one of said levers, and a jaw hinged to said fixed jaw and hinged to the other of said levers, and oppositely-arranged faces on said jaws for grasping the wire, substantially as specified.

12. In a cutter, the combination of the levers J and K, movable toward each other, a spring between said levers, a fixed holding-jaw and a fixed cutting-jaw mounted upon one of said levers, a cutting-jaw hinged to the fixed cutting-jaw and to the other of said levers, and a holding-jaw hinged to the oppositely-arranged fixed holding-jaw and also hinged to the other of said levers, said holding-jaws having an impinging face arranged opposite to the impinging face of the fixed jaw, substantially as specified.

13. In a cutter, the combination of a supporting-bracket, a pivotal pin mounted in said bracket, a lever loosely mounted on said pin, a lever fixed to said pin, a spring between said levers, a stop upon the bracket for stopping the movement of the loosely-mounted lever, and cutting-jaws mounted upon said levers, substantially as and for the purpose set forth.

In testimony whereof we have hereunto signed our names, in the presence of two attesting witnesses, at Rochester, in the county of Monroe, in the State of New York, this 10th day of September, 1889.

HENRY LACASSE.
SOL. WILE.

Witnesses:
A. E. PARSONS,
FRANK M. GOFF.